US012432641B2

United States Patent
Park et al.

(10) Patent No.: US 12,432,641 B2
(45) Date of Patent: Sep. 30, 2025

(54) SELF-ORGANIZING HYPER SYNC NETWORK

(71) Applicant: PhasorLab, Inc., Billerica, MA (US)

(72) Inventors: Joshua C. Park, Billerica, MA (US); Paul McFarthing, Boston, MA (US); Jian Cui, Waltham, MA (US); Devang Topiwala, Framingham, MA (US); Pranay Kumar Eedara, Nashua, NH (US); Yongsoon Lee, Shoreline, WA (US)

(73) Assignee: PhasorLab, Inc., Nashua, NH (US)

( * ) Notice: Subject to any disclaimer, the term of this patent is extended or adjusted under 35 U.S.C. 154(b) by 485 days.

(21) Appl. No.: 17/805,451

(22) Filed: Jun. 3, 2022

(65) Prior Publication Data
US 2022/0394588 A1    Dec. 8, 2022

Related U.S. Application Data

(60) Provisional application No. 63/196,612, filed on Jun. 3, 2021.

(51) Int. Cl.
*H04W 4/00* (2018.01)
*H04L 45/00* (2022.01)
(Continued)

(52) U.S. Cl.
CPC ........... *H04W 40/04* (2013.01); *H04L 45/122* (2013.01); *H04L 45/17* (2022.05); *H04L 45/20* (2013.01)

(58) Field of Classification Search
CPC ...... H04W 40/04; H04L 45/17; H04L 45/122; H04L 45/20; H04L 45/00
(Continued)

(56) References Cited

U.S. PATENT DOCUMENTS 6,985,549 B1   1/2006  Biracree et al.
9,048,979 B2   6/2015  Park
(Continued)

OTHER PUBLICATIONS

"Modern Wireless Indoor Positioning 2/3 (State of the Art)", https://www.galgus.ai/en/blog/modern-wireless-indoor-positioning-2-3-state-of-the-art/; Nov. 27, 2017; downloaded Mar. 20, 2024.
(Continued)

*Primary Examiner* — Marceau Milord
(74) *Attorney, Agent, or Firm* — Michael Y. Saji

(57) ABSTRACT

A self-organizing mesh network system is disclosed, comprising: at least one master node generating a timing reference signal; a plurality of regular nodes deriving time synchronization from the timing reference signal; and a wireless medium for communicating location and timestamp information among the plurality of regular nodes, The plurality of regular nodes may be configured to each use communicated location and timestamp information of nearby nodes to independently generate a location map of the nearby nodes. The plurality of regular nodes may be configured to accept an additional regular node. The plurality of regular nodes may be configured to allow a node of the plurality of regular nodes to exit the plurality of regular nodes. The plurality of regular nodes may each use communicated location and timestamp information of the plurality of regular nodes to independently generate a location map of each of the plurality of regular nodes.

16 Claims, 7 Drawing Sheets

Direction of time/frequency reference
Peer-to-peer packet exchange

(51) Int. Cl.
    *H04L 45/122* (2022.01)
    *H04L 45/17* (2022.01)
    *H04W 40/04* (2009.01)

(58) Field of Classification Search
    USPC .......................................................... 370/329
    See application file for complete search history.

(56) References Cited

U.S. PATENT DOCUMENTS

| | | | |
|---|---|---|---|
| 9,048,980 B2 | 6/2015 | Park | |
| 9,513,388 B2* | 12/2016 | Guichard | G01V 1/223 |
| 9,538,537 B1 | 1/2017 | Cui et al. | |
| 9,585,115 B2 | 2/2017 | Park | |
| 10,999,777 B2* | 5/2021 | Kuwahara | H04W 56/001 |
| 11,153,837 B2* | 10/2021 | Abedini | H04W 56/0025 |
| 2015/0260864 A1* | 9/2015 | Guichard | G01V 1/223 |
| | | | 367/81 |
| 2017/0006568 A1* | 1/2017 | Abedini | H04B 7/185 |
| 2017/0227623 A1 | 8/2017 | Park et al. | |
| 2018/0027421 A1* | 1/2018 | Chrabieh | H04W 64/00 |
| | | | 455/446 |
| 2018/0146443 A1 | 5/2018 | Park et al. | |
| 2018/0205808 A1* | 7/2018 | Yang | H04L 45/00 |
| 2018/0206075 A1 | 7/2018 | Demirdag et al. | |
| 2019/0281527 A1* | 9/2019 | Kuwahara | H04W 40/16 |
| 2019/0386926 A1* | 12/2019 | Abedini | H04W 56/0065 |
| 2019/0387486 A1* | 12/2019 | Abedini | H04W 72/21 |
| 2022/0167262 A1* | 5/2022 | Ding | H04L 67/55 |
| 2022/0295356 A1* | 9/2022 | Cheng | H04W 36/0064 |
| 2022/0338169 A1* | 10/2022 | Elshafie | H04W 40/22 |

OTHER PUBLICATIONS

International Standard: "Precision clock synchronization protocol for networked measurement and control systems", Edition 2.0, Feb. 2009.

* cited by examiner

SELF-ORGANIZING HYPER SYNC NETWORK

CROSS-REFERENCE TO RELATED APPLICATIONS

The present application claims the benefit of priority under 35 U.S.C. § 119(e) to U.S. Provisional App. No. 63/196,612, filed Jun. 3, 2021 and entitled "Self-Organizing Hyper Sync Network," which is hereby incorporated by reference in its entirety for all purposes.

In addition, the following references are hereby incorporated by reference in their entirety for all purposes: Joshua C. Park, "RF Carrier Synchronization and Phase Alignment Methods and Systems," U.S. Pat. No. 9,048,980, Oct. 1, 2013; Joshua C. Park, "RF Carrier Synchronization and Phase Alignment Methods and Systems," U.S. Pat. No. 9,048,979, Oct. 1, 2013; Pierre Vandwalle, "System and Method For Synchronizing Clocks In A Wireless Local Area Network," U.S. Pat. No. 8,831,044 B1, Sep. 9, 2014; James M. Hollabaugh, et al., "Methods and Apparatus For Synchronizing clock Signals In A Wireless System," U.S. Patent Application US2013/0301635 A1, Nov. 14, 2013; Pierre Vandwalle, "System and Method For Synchronizing Clocks In A Wireless Local Area Network," U.S. Pat. No. 8,306,014 B1, Nov. 6, 2012; Hui Dai et al., "Synchronizing Clocks In Wireless Personal Area Networks," U.S. Pat. No. 7,409,022 B2, Aug. 5, 2008; Ian Leslie Sayers, et al., "Synchronizing Clock Signals In Wireless Networks," U.S. Pat. No. 6,542,754 B1, Apr. 1, 2003; Stephen F. Smith, et al., "Carrier-Frequency Synchronization system For Improved Amplitude Modulation and Television Broadcast Reception," U.S. Pat. No. 6,563,893 B2, May 13, 2003; Timothy M. Schmidl, et al., "Timing And Frequency Synchronization of OFDM Signals," U.S. Pat. No. 5,732,113, Mar. 24, 1998.

BACKGROUND

It is instructive to describe a drone swarm. Drones, typically small and semi- or fully-autonomous, are often configured to swarm together. By staying in a same location or locality as the other drones in the swarm, the swarm is enabled to share resources, reduce computational overhead for sometimes expensive tasks such as routing and wayfinding, and provide physical redundancy and added force multiplication, particularly in military or tactical engagements. A drone swarm requires that the individual drones in the swarm are synchronized in time, to enable synchronized movement together. The drone swarm also requires the location of each drone to be coordinated in some way, for example for some or all drone locations to be known by a central processor or by some or all the individual drones. In some instances, drones in a drone swarm may not have their own GPS, or may share GPS, or may be operating in a GPS-limited or GPS-interdicted environment. In some instances, a drone swarm may be configured to hold a particular orientation in space and may require location information in order to do so.

SUMMARY

In one embodiment, a mesh network system for providing distributed synchronization is disclosed, comprising: a designated grandmaster node serving as a timing reference; a first wireless node in physical proximity to the grand master node that may be wirelessly synchronized to the grandmaster node; and a second wireless node in physical proximity to the first wireless node that may be wirelessly synchronized to the grandmaster node via the first wireless node, wherein each of the wireless nodes utilize a location propagation and sync wireless synchronization protocol based on precision time stamping.

Each of the wireless nodes may utilize a state machine with a rough sync state and an out of sync state and an out of sync hop state to achieve and maintain synchronization.

The mesh network system may self-organizes using a scoring metric relating to wireless signal quality between an individual node and the grand master node to achieve and maintain synchronization.

In another embodiment, a self-organizing mesh network system is disclosed, comprising: at least one master node generating a timing reference signal; a plurality of regular nodes deriving time synchronization from the timing reference signal; and a wireless medium for communicating location and timestamp information among the plurality of regular nodes, The plurality of regular nodes may be configured to each use communicated location and timestamp information of nearby nodes to independently generate a location map of the nearby nodes.

The plurality of regular nodes may be configured to accept an additional regular node. The plurality of regular nodes may be configured to allow a node of the plurality of regular nodes to exit the plurality of regular nodes. The plurality of regular nodes may each use communicated location and timestamp information of the plurality of regular nodes to independently generate a location map of each of the plurality of regular nodes. The plurality of regular nodes may be incorporated into a plurality of moving craft.

The plurality of regular nodes may be capable of holding a positional configuration in three-dimensional space and translating the positional configuration in three-dimensional space. A hyper sync network protocol may be used to synchronize the at least one master node and the plurality of regular nodes. A node of the plurality of regular nodes may receive location data of a distant node using one or more message routing hops via the nearby nodes. The method may further comprise round trip time measurement (RTTM) location data transmitted with a timeslot-based wireless protocol. The plurality of regular nodes may comprise a drone swarm. The nodes may comprise self-driving craft or vehicles. The nodes may comprise airborne vehicles. The nodes may comprise unmanned aircraft.

DETAILED DESCRIPTION

Figure 1:
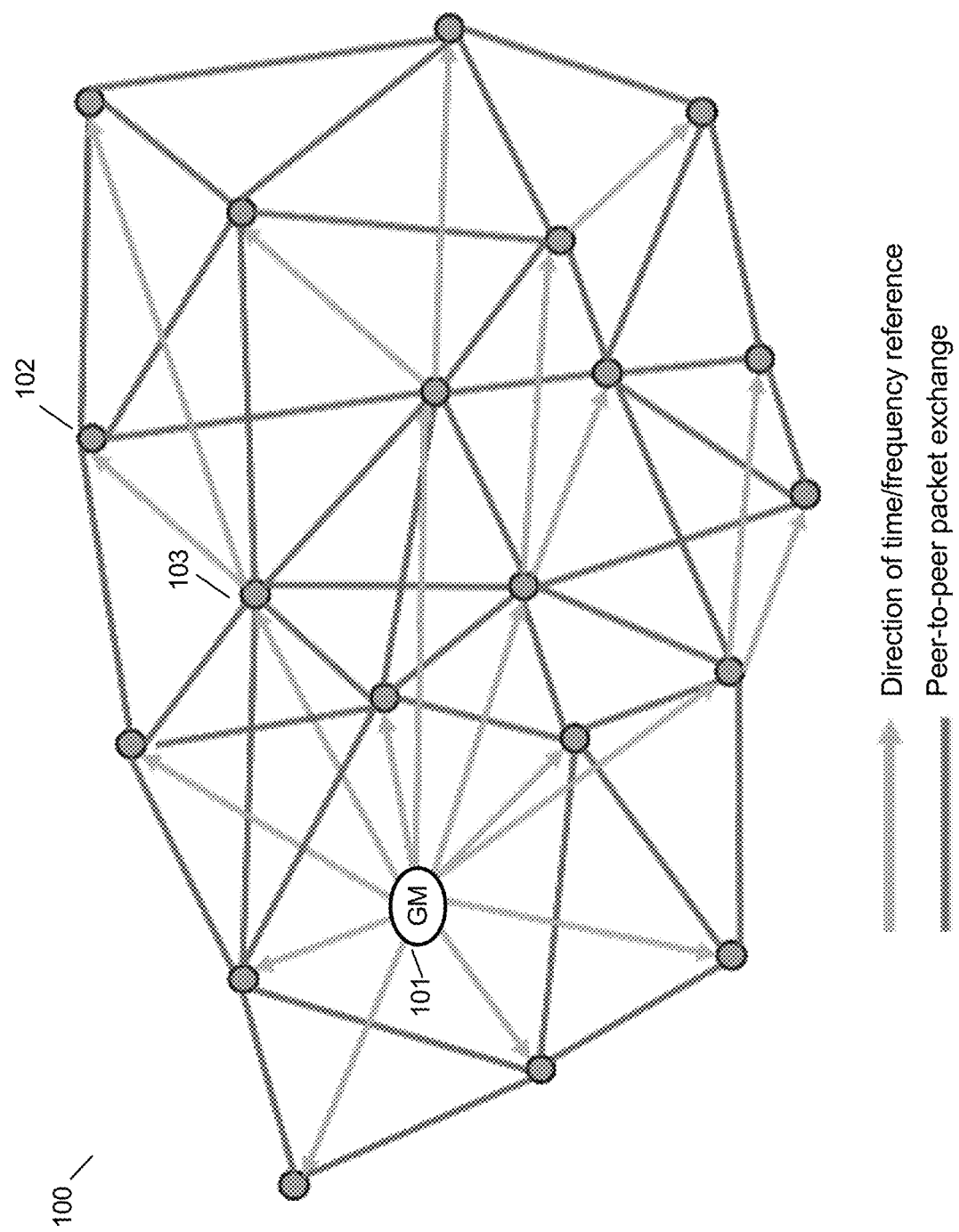
FIG. 1 is a schematic data flow diagram of a Hyper Sync Mesh Network with a single grandmaster node, in accordance with some embodiments.

Various use cases of a drone swarm or positioning-equipped mesh network are well-served by a synchronized, self-organizing mesh network. In some embodiments, a self-organizing mesh drone network is disclosed. The drone network may be a network of unmanned drones or autonomous drones. The drone network may be a wireless network of drones with or without GPS or another satellite navigation technology. The drone network may be self-organizing, in the sense that each drone is capable of awareness of, and kept up to date within the location of the others, and coordinates with the other drones in the network to hold a configuration in space, for example, a configuration where the drones swarm around a central axis, point, or shape and where the drones maintain a safe distance from each other to avoid self-collisions, where the safe distance may vary based on speed, terrain, mission objective, or other factors. The drone network may be configured to gather together in one or more formations, swarms, fleets, or other 3D configurations in space and may be pre-configured or configured during flight. The drone network may be self-organizing for a variable number of drones, or an expanding number of drones, or a set of drones that allows for new drones to be added, or that allows for existing drones to leave and/or rejoin the network.

A hybrid peer-to-peer and master-slave architecture may be used to enable the drones to share location information once synchronized with each other, in some embodiments, where each drone is in communication with a small set of other drones that it is physically close to, which are called its peers or neighbors in this disclosure. Each drone uses a timeslot-based protocol to share timestamps with each of its peers, which are then used at each individual drone to determine the location of each of its peers, thus enabling each individual drone to build a 3D map of the drones nearest to it, in some embodiments. Within each set of peers, one or more master nodes may be designated to share the time sync signal and in some embodiments the parameters or numerology of the timeslot protocol with the slave nodes. Each node (drone) in the drone network may distribute time information synchronized to the master to each of its peers, in some embodiments, where peers are neighbors of each node. Using the nodes that are most physically nearby to a given node allows locations to be determined more precisely, acquired more quickly, and updated more quickly— all of which are important attributes for a location discovery protocol capable of handling fast and precise drone formation changes.

In some embodiments, each set of peers has a master; in other embodiments, a master node propagates its time information across multiple sets of peers with the propagation hop distance dependent on the level of synchronization desired by the operator. The time information is used for location determination, in some embodiments, by use of a time-of-arrival algorithm as described herein or by use of another algorithm. In some embodiments, a node automatically becomes a master node when no master is assigned after it discovers its group of peers after bootup. Discovery of peers may be done in some embodiments by sending out a request message to discover nearby nodes. In some embodiments, a drone swarm may put together and/or share a 3D map of its peers. In some embodiments, an individual drone may use other means to discover nearby drones, such as radar scanning, to create an initial map or refine an existing map.

A single node may be part of multiple sets of peers and may share location information of drones across networks of peers, so that the location of each individual drone propagates through one or more intermediate nodes in the network in a peer-to-peer fashion until each drone has imperfect information about all drones in the swarm, even those which are not its neighbors, in some embodiments. One benefit of this approach is that each drone has the most up-to-date and timely location information about the drones it is closest to, e.g., its neighbors. This enables each drone to effectively, reliably and safely make its own independent navigation decisions using location data, while still enabling a larger set of drones to travel together in a swarm or other configuration. The set of neighbors and peers may be a short distance away (e.g., inches or meters) or a long distance away (e.g., kilometers), depending on the use case, e.g., the peer network for a drone swarm may require a higher precision and higher frequency of updates than a peer network for a regional air traffic control system.

A single drone may be part of multiple sets of peers and may transmit its location to more than one set of peers, in some embodiments. Reuse of timeslots may use knowledge of position, in some embodiments. For example, a particular timeslot may be used by a particular drone to share its location to more than one set of peers, or, a particular timeslot may be used by a first set of peers governed by a first master to communicate with a first drone and the same timeslot may also be used by a second set of peers governed by the same first master to communicate with a second drone, where the first drone and the second drone are far enough apart that they do not need to communicate with each other within the same set of peers.

HSN uses a scoring system consisting of several metrics. One of the key ones being the RSSI and hop away from the Grandmaster. Every HSN node calculates this ranking score and passes it to the neighbors during RTTMs. The nodes then each independently build a scoring table with their 1-hop neighbor scores and periodically update it. This scoring table allows it to choose the best timing and frequency master at any given time. The node follows the search procedure for picking the best master from neighbors every few periods. If a neighbor with a better score than the current master is found, then a switching procedure takes place. In some embodiments, mechanisms analogous to those found in IEC 61588/IEEE 1588 2009-02, hereby incorporated by reference, or any other version could be used to select a master node.

This procedure provides resiliency to the network in case of several nodes going down. HSN Nodes may store a routing table for an optimal path and backup paths for packet routing between nodes, in some embodiments, and may also send out the periodic network path discovery messages allowing it to keep the routing information up to date.

A grandmaster node is a node that is used as a master by other master nodes, in some embodiments. The closest nodes to a grandmaster are time synchronized to the grandmaster wirelessly. Nodes that are farther away use the nodes closest to the grandmaster as time and frequency synchronization masters. This can continue for several levels to cover all the nodes in the system. If more than one grandmaster is present, each node automatically uses the node with the best connection to the grandmaster as its master. As nodes and masters enter or leave the system, the mesh network reconfigures to find the best available master. In some embodiments, ranking systems ensure the best timing masters at any given time, with support for grandmaster messages and elections. In some embodiments, self-organization is achieved by maintaining communication with neighboring nodes (aside from master nodes). Neighboring nodes serve as the group of potential master candidates for a given node when it loses its master. Use of sync quality ranking system as part of communication in order to inform the neighboring nodes its available options for master node candidates. Most optimal time synchronization can be achieved by use of ranking system in selecting one's master node during the self-organizing process.

In some embodiments, wireless synchronization is used, such as the wireless synchronization described in one or more of: US20180206075A1; U.S. Pat. No. 9,538,537B1; US20180146443A1; US20170227623A1; U.S. Pat. No. 9,048,979, each of which is hereby incorporated by reference in its entirety for all purposes. Where HSN or "Hyper Sync Network" is mentioned, a network using one of the wireless synchronization methods in these incorporated references is understood to be used. The Hyper Sync Network (HSN) uses the proprietary wireless radio to achieve the sub-nanosecond (<<1 ns) level timing and fraction of the ppb (<<1 ppb) level frequency synchronization amongst the nodes. The HSN mesh is frequency agnostic. HSN Mesh forms with at least one Timing Master, (GM—Grand Master). GM node has the capability of generating pulse per second (PPS) sync signals from GPS and can accept external PPS sources as well.

In addition to providing high-quality synchronization, HSN mesh nodes utilize a frequency hopping mechanism to avoid poor local channel conditions such as congestion or RF interference from other nodes outside of Mesh in the case of ISM Band. This allows the mesh nodes to use slightly different carrier frequency every few measurements and provides diversity in measurements which can yield better results when compared to only single carrier frequency measurements.

FIG. 1 is a schematic data flow diagram of a Hyper Sync Mesh Network with a single grandmaster node, in accordance with some embodiments. An example of a self-organizing HSN mesh network 100 with a single grandmaster node 101 is shown; at least one grandmaster or master node is needed. Regular node 102 unidirectionally receives time/frequency reference data from grandmaster node 101 via intermediate 1-hop node 103. Data is passed around through the network via intermediate nodes as needed, including peer to peer time data. Regular node 102 receives RTTM messages from its immediate neighbors, including intermediate 1-hop node 103.

Figure 2:
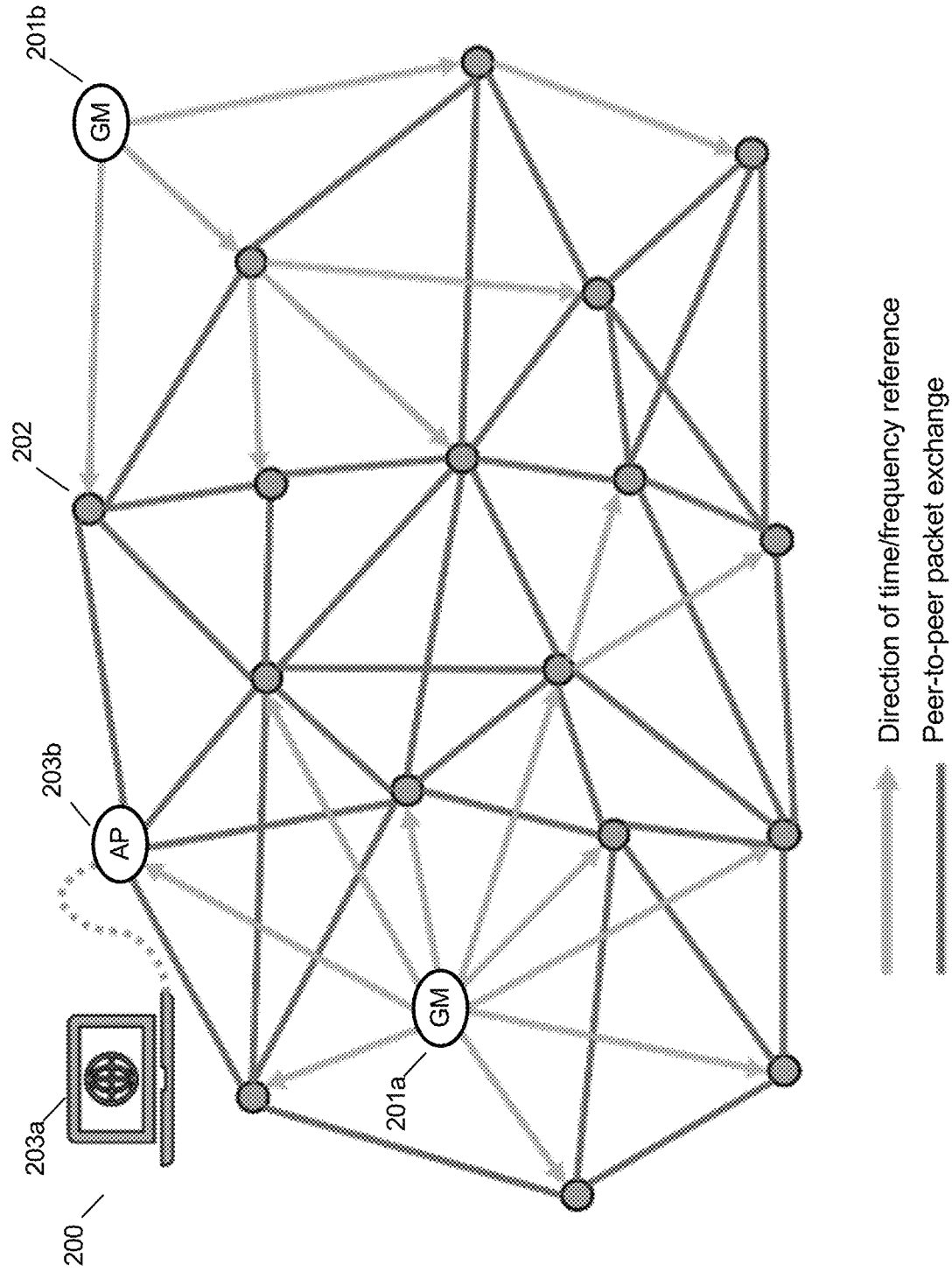
FIG. 2 is a schematic data flow diagram of a Hyper Sync Mesh Network with two grandmaster nodes and a gateway node, in accordance with some embodiments.

FIG. 2 is a schematic data flow diagram of a Hyper Sync Mesh Network with two grandmaster nodes and a gateway node, in accordance with some embodiments. Two grandmaster nodes 201a and 201b provide time and frequency sync to different subsets of the overall network, such that regular node 202 receives its time and frequency sync from grandmaster 201b; however, 201a and 201b are in tight sync and the entire network remains in sync. Wireless access point 203b participates in the mesh network, and acts as a gateway through laptop 203a to the public Internet. Data is passed around through the network via intermediate nodes as needed, including peer to peer time data. Regular node 102 receives RTTM messages from its immediate neighbors.

Figure 3:
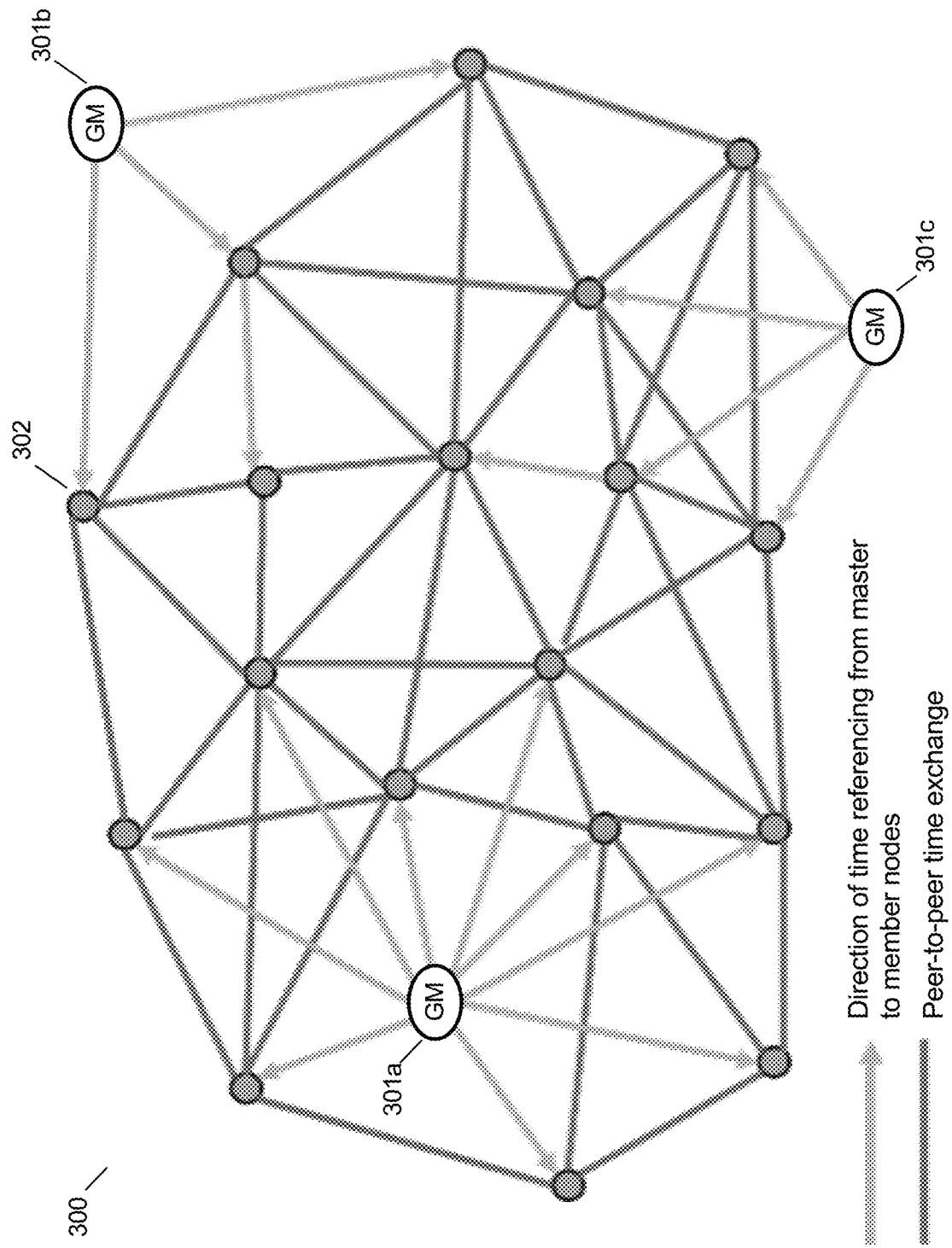
FIG. 3 is a schematic data flow diagram of a Hyper Sync Mesh Network with three grandmaster nodes, in accordance with some embodiments.

FIG. 3 is a schematic data flow diagram of a Hyper Sync Mesh Network with three grandmaster nodes, in accordance with some embodiments. Three grandmaster nodes 301a, 301b, 301c provide time and frequency sync to different subsets of the overall network, such that regular node 302 receives its time and frequency sync from grandmaster 301b; however, 301a-301c are in tight sync and the entire network remains in sync. Data is passed around through the network via intermediate nodes as needed, including peer to peer time data. Regular node 302 receives RTTM messages from its immediate neighbors.

In some embodiments, the connectivity for a particular mesh network may be enabled to expand without limit aside from the physical bounds of memory and physical space. In some embodiments, the mesh network can allow subnetworks to be associated and disassociated on an as-needed basis, i.e., the mesh network may be self-healing. In some embodiments, multiple mesh networks may be independently coordinated, but a particular node may leave the coordination zone of a first mesh network and subsequently or simultaneously enter the coordination zone of a second mesh network, for example, analogous to the current manually-operated United States air traffic control system. In some embodiments, a node may request, and receive, comprehensive location information for every node in a coordinated mesh network; this comprehensive location information may be delivered to the requesting node over a longer period of time than location updates from its peers. In some embodiments, each node in the mesh network may have a unique identifier allowing it to be identified in a particular mesh network, or across multiple mesh networks or regionally or globally; in some embodiments, the identifier would be administered using a regional, national, or international drone registration regulatory agency. The identifiers could be broadcast by the mesh network nodes to any nearby receivers, in some embodiments.

In some embodiments, the self-organizing mesh drone network may use a timeslot-based communications protocol for coordinating and sharing information among the self-organizing drones. The timeslot-based communications protocol may divide time into periods, frames, slots, and packets, wherein a single packet may be used either for location request or location reply (or requesting or receiving other information). In some embodiments, an algorithm for reuse of communication timeslots is used to enable a drone network to dynamically change a variable number of drones to be organized. In some embodiments, the protocol may use round trip time measurement (RTTM) messages that contain timing information and header fields; the RTTM messages may also carry timing or other data payloads, such as GPS location or control messages, in some embodiments.

Figure 4:
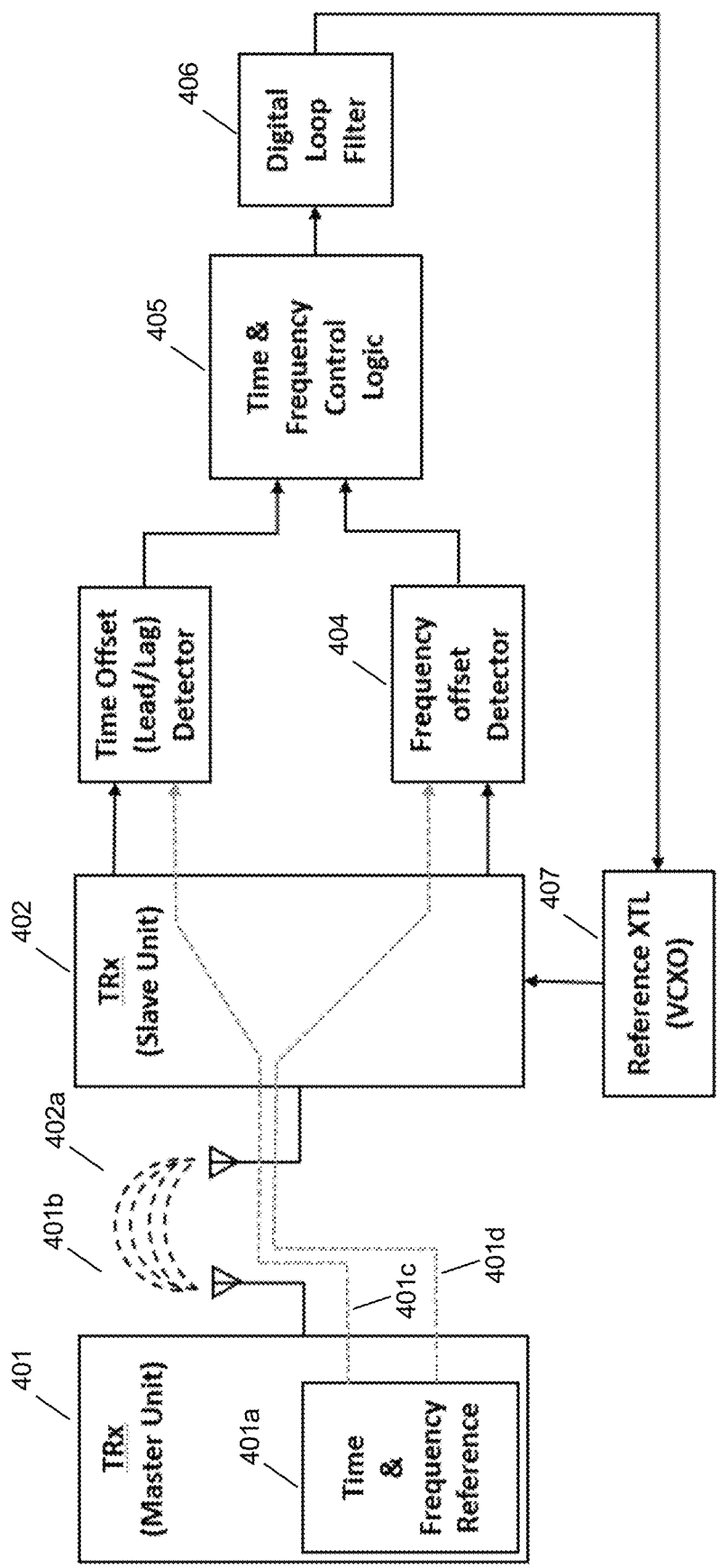
FIG. 4 is a schematic diagram of a wireless frequency locked loop for a Hyper Sync Mesh Network node, in accordance with some embodiments.

FIG. 4 shows a wirelessly synchronized Time and Frequency Lock Loop System, namely, a schematic block diagram of a master and slave wireless synchronization system, in accordance with some embodiments. In FIG. 4, a master unit transmit/receive unit (TRXU) 401 that includes a time and frequency reference 401a as shown. The frequency reference 401a is shown with a wireless connection via antenna 401b to slave unit transmit/receive unit (TRXU) 402. Time and frequency reference 401a also is connected to the slave unit 402 via the wireless connection, and a time offset signal 401c and a frequency offset signal 401d are shown. In some embodiments, the frequency offset signal received from the master device is called a master device reference signal, and the time offset signal received from the master device is or contains a time stamp, and is called a master device time stamp, in the present disclosure. In some embodiments a specific signal is sent from the master unit 401; however, it is noted that in some embodiments no special signal 401c, 401d are needed, as these offsets can be derived directly from the carrier signal of the master unit, which is received by the slave unit during any data transmission according to any protocol, making the present synchronization system able to operate as a "blind synchronization" system without embedded beacons or prearranged messages, in certain embodiments. Typically, a time stamp is used for time offset signal 401c, and any RF carrier is used for frequency offset signal 401d.

Slave unit transmit/receive unit (TRXU) 402 has an antenna 402a, and sends the time offset signal 401c to the time offset detector 403 and the frequency offset signal 401d to the frequency offset detector 404. In the case that the time and/or frequency offset are derived at the slave and not received as a prearranged synchronization message or time stamp, the received signal may be the carrier signal (e.g., signal samples) and the slave unit TRXU may send it to both the time offset detector 403 and the frequency offset detector 404. The signal samples may be baseband signal samples. Slave TRXU also is part of the signal loop for the reference crystal 407, and passes the reference crystal signal onto the time offset detector and the frequency offset detector.

The time offset detector 403 performs measurement of the signal path delay for the wireless transmission between the master and slave TRXUs. One method for doing so is by time stamp exchange, as described elsewhere herein; in some methods at least one time stamp may be used to bring the master and slave into an initial synchronization state. Another method for doing so is to perform phase offset detection by comparing the timing signal from the reference crystal and the received baseband signal samples from the master TRXU. These methods may be used in conjunction with each other, as the methods have different granularity and applicable ranges, and hence different applications. If a time stamp is used, the time stamp may be extracted from the time stamp message using any means as would be understood by one having skill in the art, such as examining a received bit vector or demodulating a message and decoding the text of the message.

The frequency offset detector 404 performs measurement of the carrier frequency offset between the master and the slave units. As with the time offset detector, multiple methods can be used in conjunction. In a first method, the information from the time offset detection module may be used over time to determine whether the slave unit is gradually slowing down or gradually speeding up, which provides the sign of whether to increase or decrease the clock of the slave unit. In this method, an additional coupling may exist between the time offset detector 403 and the frequency offset detector 404, or a memory or data store could be used to store the time stamp messages for use by either or both of time and frequency offset detectors 403 and 404. In a second method, the frame data or preamble content of a particular message can be used to determine the direction and rate of phase rotation, which can be used to estimate frequency offset. In a third method, a non-preamble blind carrier synchronization technique can be used to estimate the frequency offset in the case of having available I and Q samples; for example, the use of squares or absolute values of the in-phase and quadrature samples could be used. In some embodiments, a carrier frequency may be known in advance, either from past communications or via configuration.

The output of the time offset detector 403 and the output of the frequency offset detector 404 are fed into the time and frequency control logic 405. This logic circuit performs a test to determine whether the reference clock should be sped up or slowed down. The time and frequency logic is described more fully at FIG. 5.

The output of the time and frequency control logic 405 is a digital loop filter 406, such as a low pass filter. The low pass filter performs its typical function as in a PLL, providing filtering of the control signal to reduce jitter and allowing the oscillator to converge to a stable final voltage that is locked onto the input voltage. The digital loop filter may be used to determine the upper limit on the PLL's response.

The output of the digital loop filter is sent as a control signal to the reference crystal 407, completing the closed loop. Reference crystal 407 may have a voltage control for tuning the crystal, enabling the local device to stay in frequency and time lock with the master device. To maintain lock, the system may attempt to keep the time offset and frequency offset within a hold-in range, which is the range within which any perturbations can be damped so as to return the system to a locked state.

Time and carrier frequency of Master node are carefully monitored and its outcome collaboratively decides the way the reference crystal of slave node is being controlled.

Figure 5:
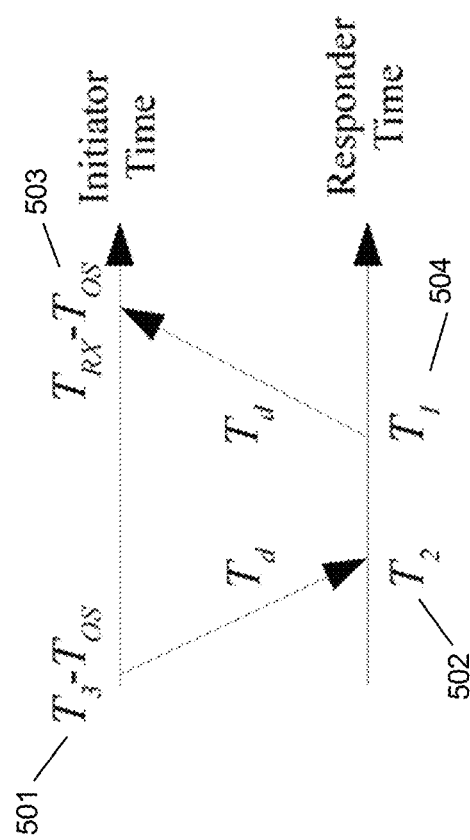
FIG. 5 shows a round-trip time measurement (RTTM) packet exchange, in accordance with some embodiments.

FIG. 5 shows the HSN mesh protocol, in some embodiments. The HSN nodes communicate with each other using Round Trip Time Measurement packets (RTTM). Every HSN node has an addressable networkwide unique Node ID. The RTTM message between the two parties contains the originator's transmission time 501 (T_3-T_OS); upon receiving the packet at 502, the responder time stamps (T2) the package using the described extremely precise time stamping mechanism. At 504 the responder now sends back the packet with both the recorded time stamp called arrival time (T2) and the time of reply (T1). At 503, the initiator in a similar manner time stamps the packet and calls it receive time (T_Rx). Using the RTTM reply the initiator node then corrects its time clock offset (TOS).

FIG. 5 shows a round-trip time measurement (RTTM) packet exchange, in accordance with some embodiments.

$$T_2 - T_d = T_3 - T_{OS}$$

$$T_1 + T_d = T_{Rx} - T_{OS}$$

So that:

$$T_{OS} = \frac{(T_{Rx} + T_3) - (T_1 + T_2)}{2}$$

$$T_d = \frac{(T_{Rx} - T_3) - (T_1 - T_2)}{2}$$

HSN uses multiple mechanisms to correct frequency and time offsets and the method discussed here is one of them. HSN nodes also uses the packet preamble to find the RTTM message arrival time and start of the frame using the described correlation methods. Moreover, HSN nodes also may utilize High-Precision Carrier Synchronization Technology (HPCST) in a blind fashion to measure the frequency and time offsets utilizing the entire packet energy. Successful RTTM measurements allow the nodes to constantly discipline the local time/frequency source.

HSN's tight frequency and timing synchronization allows it to be used as a precision measurement device. HSN provides decimeter level of accuracy across the mesh. The accuracy can be increased by dense deployment and increasing the GDOP.

Figure 6:
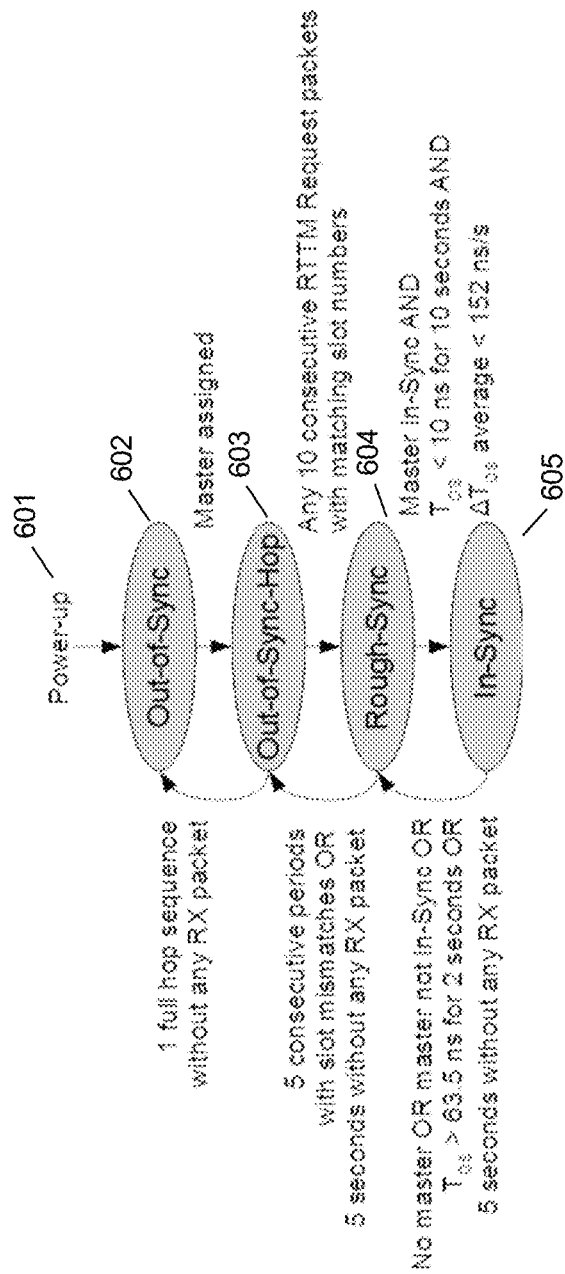
FIG. 6 shows various synchronization states of the network and a node bootup sequence and state diagram, in accordance with some embodiments.

FIG. 6 shows various synchronization states of the network and a node bootup sequence and state diagram, in accordance with some embodiments. HSN nodes are classified into the following states: Sync State 605; Rough Sync State 604; Out of Sync state 602; and Out of Sync Hop state

603, as well as power-up state 601. The states are classified in order to identify the node's instantaneous synchronization quality. Based on the synchronization status multiple states are defined, such as: out-of-sync status, rough synch status, in sync status. These defined statuses allow each node to follow a predetermined operation protocol, which in turn allows guaranteed eventual outcome of optimally synchronized mesh network as long as wireless communication is allowed. This architecture allows multiple master clocks to co-exist and be part of the overall network and still maintain the optimal sync quality for the entire nodes.

The state-changing conditions are programmable and can be adapted to fit the needs of the deployment. At bootup 601, the node is considered out of sync. It listens to traffic for a full cycle of hopping frequency sequence. This allows it to infer the hopping schedule of the network. The node listens to RTTM traffic around it and tries to align its internal clock to the boundary of the network wide slots' clock and achieve a rough sync state. Rough sync state definition is programmable, one such instance of imposed condition as shown in the diagram.

Figure 7:
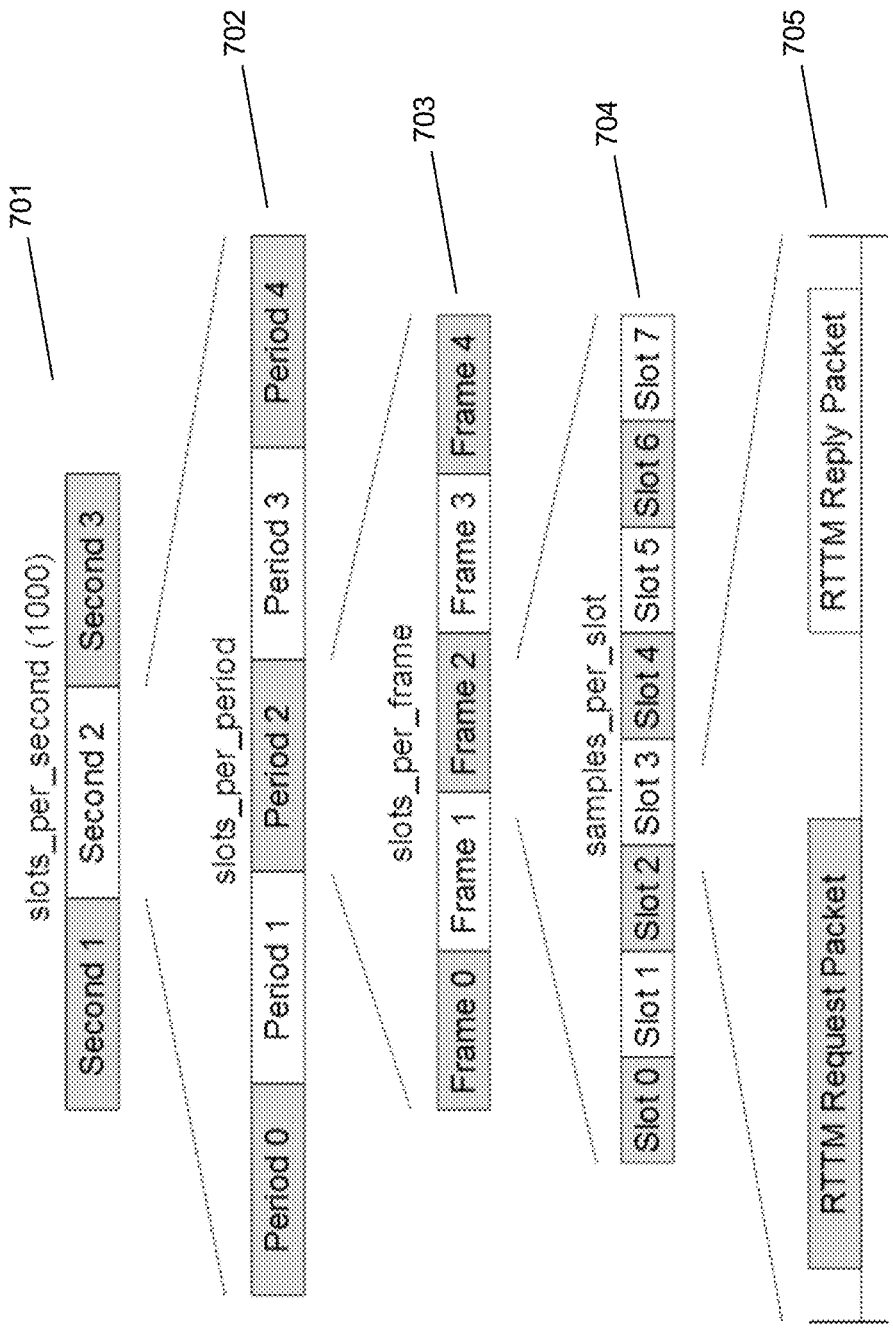
FIG. 7 shows a HSN TDMA Based MAC Scheduling scheme, in accordance with some embodiments.

FIG. 7 shows a HSN TDMA Based MAC Scheduling scheme, in accordance with some embodiments. HSN in current forms uses the TDMA as its medium access scheme. The system is flexible and can be adapted for contention-based and other MAC protocols. One such instance of the TDMA based schedule is shown in the figure. TDMA allows precise control over the MAC transmission times and enables HSN to support the deterministic time applications. Every node keeps a local timer and keeps updating it via the exchange of packets with neighboring nodes.

In this instance of the TDMA based schedule, every node is assigned a frame. This frame is subdivided into slots. The owner node of the frame initiates the RTTM message. Typically, during the frame owning node will perform several RTTM with Master node. This allows the node to be in synchronization. Rest of the slot in the frames will be used for keeping track of neighbors via RTTM and passing other status messages allowing the inherent redundancies.

In some embodiments, one or more radios may be used with support for wide range of frequency and different bandwidths. Doppler measurement may be used when available; one-way delay measurements are all that is required to enable the present disclosure. Sub-meter level positioning accuracy is understood to be used for drones and other high-speed and close-distance applications. In some embodiments, a wireless mesh networking stack providing on-demand traffic routing, PPS generation capability for timing and frequency reference, routing new path discovery for nodes within the mesh may be used. In some embodiments, precise timing of the sensor data acquisition may be enabled at each mesh node to enable amalgamating the measurements based on noise profile and accuracy of the node's sensors.

In some embodiments, sensor fusion or location understanding may be used to concurrently accommodate other location technologies such as GPS, RTK, Vision based, optical sensor and use it to improve the positioning accuracy by combining measurements. Where transmission of location information or location maps is described herein, location may also incorporate GPS coordinates when and where GPS is available, in some embodiments.

Where GPS is described, other satellite navigation technologies such as GLONASS, Galileo, BeiDou, NavStar, IRNSS, GNSS etc. are considered to be equivalent and understood by the inventors to be able to be used with embodiments of the present invention. Where drones are described, one or more drones may have the ability to allow for manual (remote human or non-human) control or override, and the network described herein may have the ability to self-organize while also incorporating manual control or override, by, for example, allowing the manually-controlled drone to be exempt from a location configuration program or by allowing the manually-controlled drone to be the source of location configuration information for the automatically-controlled drones. As used herein, the words "node" and "drone" as applied to the embodiments disclosed herein are both used to mean a node in a mesh network embodied in a drone or other vehicle, unless otherwise specified. As used herein, location information means 3D location information unless otherwise specified. As used herein, timestamps may be sent or stored with arbitrary precision. Various use cases are also considered to be enabled by the location mesh network of the present disclosure, such as self-driving cars, self-driving taxis, self-flying aerial passenger vehicles, municipal or regional air traffic control, military vehicles, military drones, spacecraft, non-moving mesh network location trackers, etc.

From the foregoing, it will be clear that the present invention has been shown and described with reference to certain embodiments that merely exemplify the broader invention revealed herein. Certainly, those skilled in the art can conceive of alternative embodiments. For instance, those with the major features of the invention in mind could craft embodiments that incorporate one or major features while not incorporating all aspects of the foregoing exemplary embodiments.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Features of one embodiment may be used in another embodiment. Other embodiments are within the following claims.

The invention claimed is:

1. A mesh network system for providing distributed synchronization, comprising:
   a grandmaster node serving as a timing reference;
   a first wireless node in physical proximity to the grandmaster node that is wirelessly synchronized to the grandmaster node; and
   a second wireless node in physical proximity to the first wireless node that is wirelessly synchronized to the grandmaster node via the first wireless node,
   wherein each of the wireless nodes utilize a location propagation and sync wireless synchronization protocol based on precision time stamping; and
   wherein each of the wireless nodes periodically operates logic to classify itself as master node or slave node based on received time stamp messages from neighboring nodes.

2. The system of claim 1, wherein each of the wireless nodes utilize a state machine with a rough sync state and an out of sync state and an out of sync hop state to achieve and maintain synchronization.

3. The system of claim 1, wherein the mesh network system self-organizes using a scoring metric relating to wireless signal quality between an individual node and the grand master node to achieve and maintain synchronization.

4. A self-organizing mesh network system, comprising:
   at least one master wireless node generating a timing reference signal;
   a plurality of regular wireless nodes deriving time synchronization from the timing reference signal; and
   a wireless medium for communicating location and timestamp information among the plurality of regular wireless nodes and the at least one master wireless node,
   wherein the plurality of regular wireless nodes is configured to each use communicated location and timestamp information of nearby nodes to independently generate a location map of the nearby nodes; and
   wherein each of the regular wireless nodes periodically operates logic to classify itself as master node or slave node based on received time stamp messages from neighboring nodes.

5. The mesh network system of claim 4, wherein the plurality of regular nodes is configured to accept an additional regular node.

6. The mesh network system of claim 4, wherein the plurality of regular nodes is configured to allow a node of the plurality of regular nodes to exit the plurality of regular nodes.

7. The mesh network system of claim 4, wherein the plurality of regular nodes each use communicated location and timestamp information of the plurality of regular nodes to independently generate a location map of each of the plurality of regular nodes.

8. The mesh network system of claim 4, wherein the plurality of regular nodes are incorporated into a plurality of moving craft.

9. The mesh network system of claim 4, wherein the plurality of regular nodes comprises a drone swarm.

10. The mesh network system of claim 4, wherein the plurality of regular nodes is capable of holding a positional configuration in three-dimensional space and translating the positional configuration in three-dimensional space.

11. The mesh network system of claim 4, wherein a hyper sync network protocol is used to synchronize the at least one master node and the plurality of regular nodes.

12. The mesh network system of claim 4, wherein a node of the plurality of regular nodes receives location data of a distant node using one or more message routing hops via the nearby nodes.

13. The mesh network system of claim 4, further comprising round trip time measurement (RTTM) location data transmitted with a timeslot-based wireless protocol.

14. The mesh network system of claim 4, wherein the nodes comprise self-driving craft or vehicles.

15. The mesh network system of claim 4, wherein the nodes comprise airborne vehicles.

16. The mesh network system of claim 4, wherein the nodes comprise unmanned aircraft.

* * * * *